(12) United States Patent
Kwun et al.

(10) Patent No.: US 7,497,289 B2
(45) Date of Patent: Mar. 3, 2009

(54) STRUCTURE OF CARRIER

(75) Inventors: Doo-Hyuk Kwun, Paju-si (KR);
Kwang-Seob Kim, Gwacheon-si (KR);
Sung-Hoon Jung, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 98 days.

(21) Appl. No.: 11/299,744

(22) Filed: Dec. 13, 2005

(65) Prior Publication Data
US 2006/0225933 A1    Oct. 12, 2006

(30) Foreign Application Priority Data
Sep. 22, 2005  (KR) .................. 10-2005-0088250
Oct. 4, 2005   (KR) .................. 10-2005-0093154

(51) Int. Cl.
*B60K 11/04* (2006.01)
(52) U.S. Cl. ................. 180/68.4; 180/68.6; 296/193.09
(58) Field of Classification Search ................ 180/68.4, 180/68.6; 296/193.09, 187.09, 187.12; 29/897.2
See application file for complete search history.

(56) References Cited

U.S. PATENT DOCUMENTS

| 4,428,447 | A  | * | 1/1984  | Malen ...................... 180/68.4 |
| 5,316,079 | A  | * | 5/1994  | Hedeen ..................... 180/68.4 |
| 6,227,321 | B1 | * | 5/2001  | Frascaroli et al. .......... 180/68.4 |
| 6,287,442 | B1 | * | 9/2001  | Tarahomi .................... 204/479 |
| 6,293,615 | B1 | * | 9/2001  | Tarahomi .................... 180/68.4 |
| 6,712,426 | B2 | * | 3/2004  | Ritchie et al. ........... 296/187.09 |
| 6,948,769 | B2 | * | 9/2005  | Borkowski et al. ....... 296/203.02 |
| 7,007,385 | B2 | * | 3/2006  | Tarahomi ............... 296/193.09 |
| 2002/0079151 | A1 | * | 6/2002 | Decker et al. .............. 180/68.4 |
| 2005/0103822 | A1 |   | 5/2005 | Ahn |
| 2005/0275227 | A1 |   | 12/2005 | Ahn |

FOREIGN PATENT DOCUMENTS

JP        2004-299588        10/2004

OTHER PUBLICATIONS

English Language Abstract of JP 2004-299588.

* cited by examiner

*Primary Examiner*—Hau V Phan
(74) *Attorney, Agent, or Firm*—Greenblum & Bernstein, P.L.C.

(57) ABSTRACT

A structure of a carrier is disclosed. The structure includes an upper frame; side frames in a pair formed downwardly from both sides of the upper frame; and center frames, each of which has one end connected to the central portion of the upper frame and the other end slantingly connected to the corresponding one of the side frames. Since the center frames are slantingly installed and support the upper frame and the side frames, the structure of the carrier has reduced weight and enables the maintenance of sufficient rigidity.

6 Claims, 5 Drawing Sheets

STRUCTURE OF CARRIER

BACKGROUND OF THE INVENTION

1. Field of the Invention

The present invention relates to the structure of a carrier, which does not have a lower frame, and has sufficient rigidity maintained through the center frames slantingly extended from the center of an upper frame to side frames, thereby having light weight and enabling the maintenance of sufficient rigidity.

2. Description of the Related Art

Generally, a vehicle body forms the external appearance of a vehicle, and comprises a vehicle chamber, an engine room, a trunk, a fender, etc. The above vehicle body is divided into a front body, a central body, and a rear body in a longitudinal direction of the vehicle.

A carrier for assembling head lamps, a radiator, a condenser, and a bumper is installed on the front body.

FIG. 1 is a perspective view of a conventional carrier for vehicles.

As shown in FIG. 1, a Front End Module (FEM) technique, which assembles head lamps, a radiator, a condenser, and a bumper with a vehicle body panel into one unit so as to improve assembly efficiency in manufacturing, reduces the number of components to be assembled, so as to shorten the time taken to assemble the carrier, and assures an assembling degree of the carrier, is applied to the carrier.

That is, the carrier 10 is generally divided into head lamp mounting portions 11 for mounting head lamps thereon, and a cooling module mounting portion 12 for mounting a cooling module thereon, such as a radiator and a condenser, on the front surface thereof.

The cooling module mounting portion 12 comprises an upper frame 13, a center frame 14 extended downwardly from the central portion of the upper frame 13 for mounting a horn speaker of the vehicle thereon, a lower frame 15 formed at the lower portion of the cooling module mounting portion 12 for mounting a bumper and a fog light thereon, and side frames 16, each of which has one end connected to the corresponding one of both ends of the lower frame 15 and the other end connected to the corresponding one of both ends of the upper frame 13.

The cooling module is fixedly connected to the lower frame 15 of the carrier 10. More specifically, a pair of connection plates 17 protrudes from the lower frame 15, and connection holes 18, into which protrusions of the cooling module are inserted, are respectively formed through the connection plates 17.

The head lamp mounting portions 11 are formed at both sides of the upper frame 13. One end of each of the head lamp mounting portions 11 is connected to the upper frame 13, and the other end of each of the head lamp mounting portions 11 is connected to the corresponding one of the side frames 16.

A hydride-type carrier, which is made of steel and plastic by molding, has recently been employed.

The weight of the carrier is generally 4.5~5.5 kg. The carrier has a considerably heavy weight, thus lowering fuel consumption efficiency of the vehicle.

Further, since many raw materials are required to manufacture the carrier, when the costs of the raw materials are increased, the carrier has high production costs, thus causing a burden in the manufacture of the carrier.

SUMMARY OF THE INVENTION

Therefore, the present invention has been made in view of the above problems, and it is an object of the present invention to provide the structure of a carrier, which has a reduced weight and enables the maintenance of sufficient rigidity.

In accordance with the present invention, the above and other objects can be accomplished by the provision of a structure of a carrier comprising: an upper frame; side frames in a pair formed downwardly from both sides of the upper frame; and center frames, each of which has one end connected to the central portion of the upper frame and the other end slantingly connected to the corresponding one of the side frames.

In order to reduce the total weight of the carrier, the structure of the carrier of the present invention does not have a lower frame, and allows the center frames, slantingly installed, to support the upper frame and the side frames.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
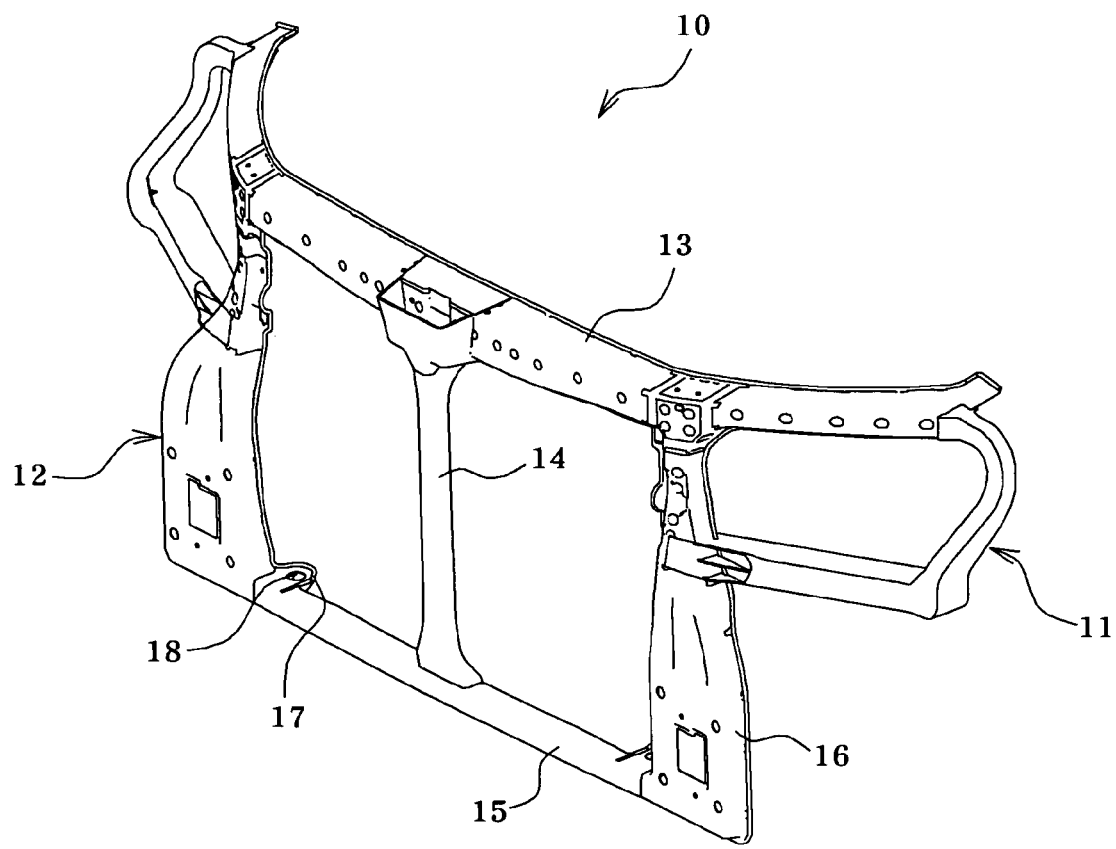
FIG. 1 is a perspective view of a conventional carrier for vehicles.

Now, a preferred embodiment of the present invention will be described in detail with reference to the annexed drawings.

This embodiment does not limit the scope and spirit of the invention, but has been made only for a better understanding of the present invention. In the following description of the present invention, some parts, which are substantially the same as conventional parts, are denoted by the same reference numerals even though they are depicted in different drawings.

Figure 2:
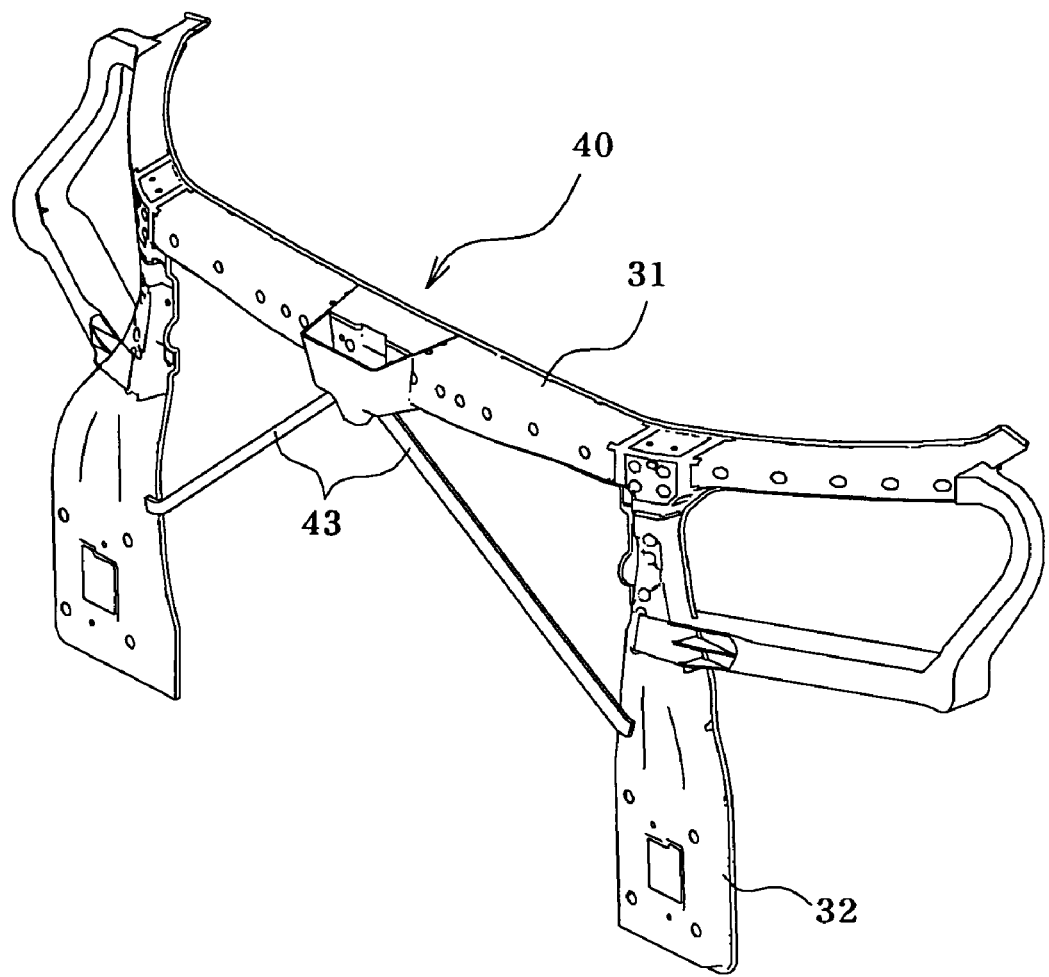
FIG. 2 is a perspective view of a carrier for vehicles in accordance with the present invention.
Figure 3:
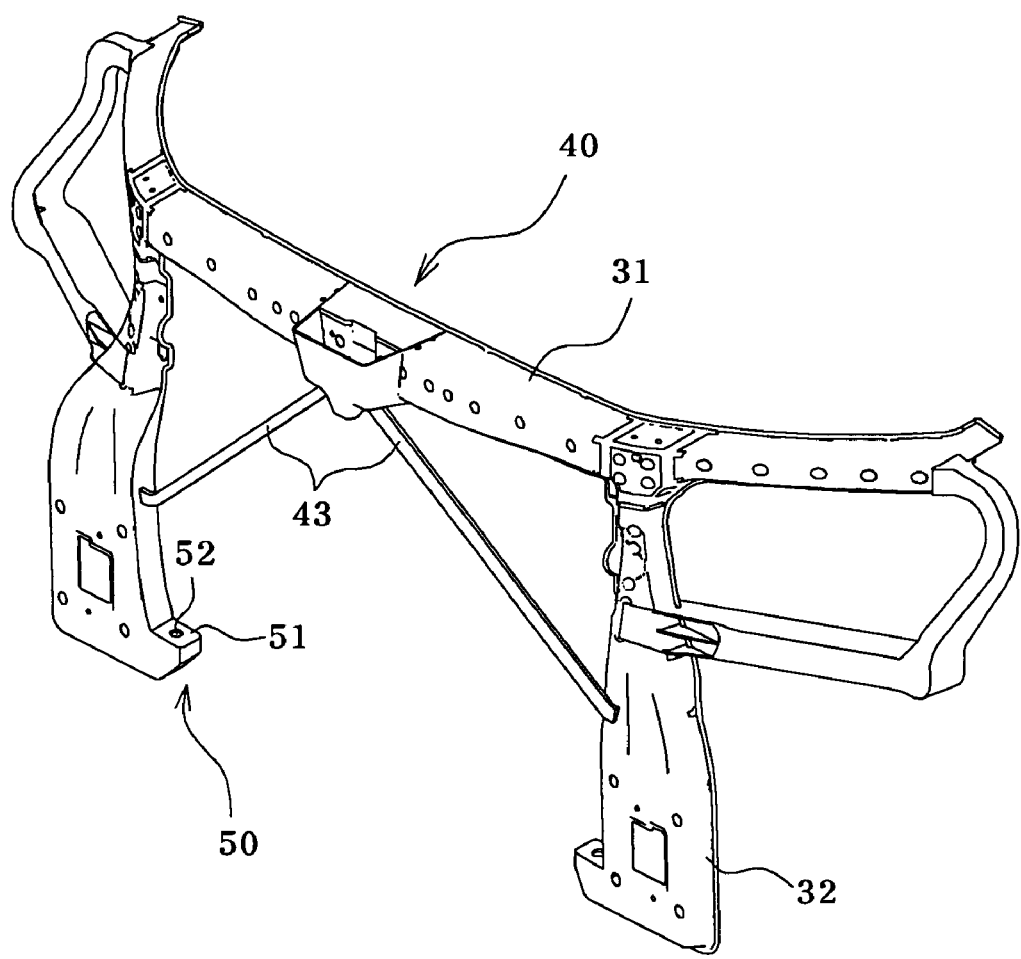
FIG. 3 is a perspective view of the carrier, in which mounting portions are respectively formed on side frames.
Figure 4:
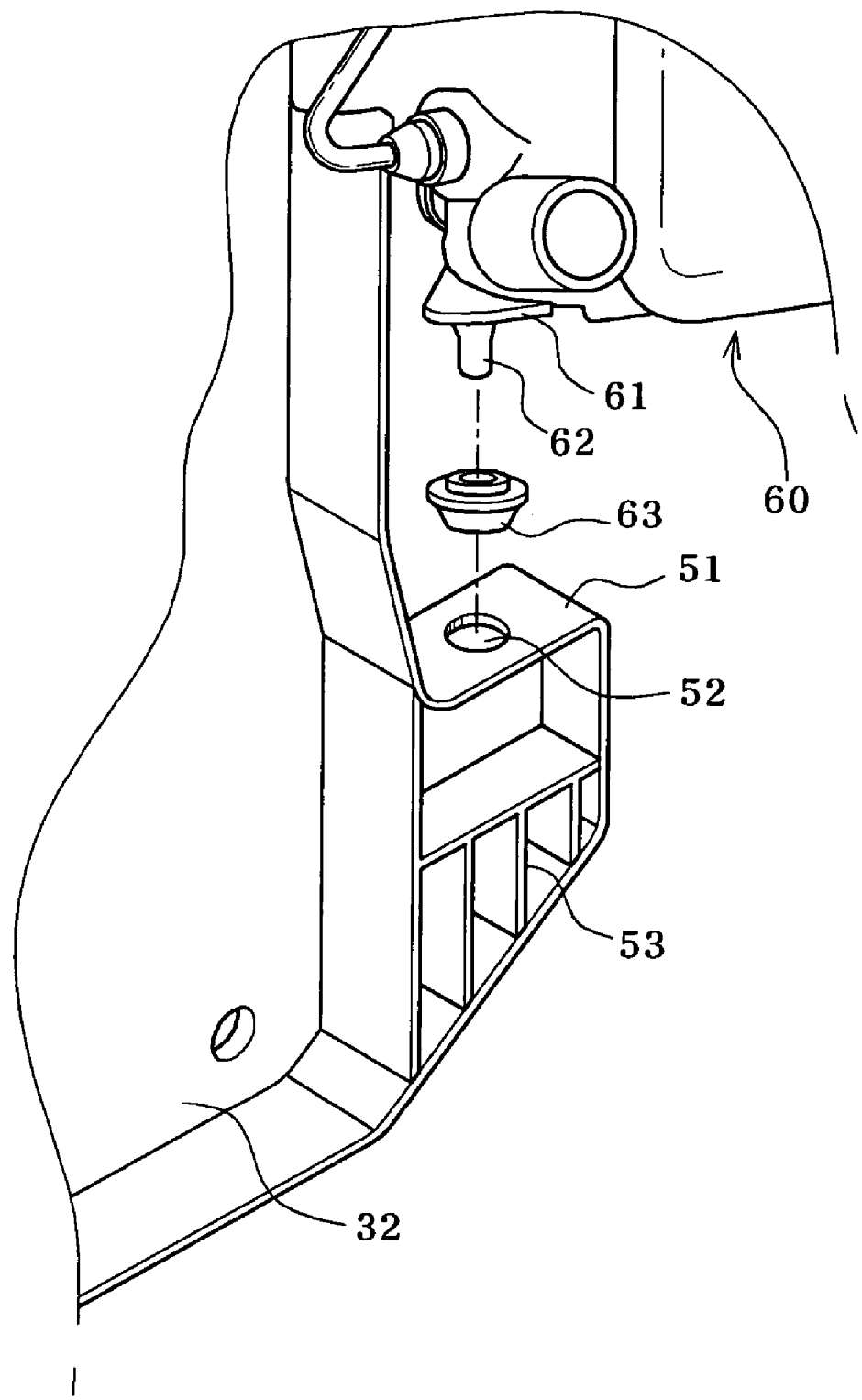
FIG. 4 is a schematic view illustrating ribs for supporting the mounting portion shown in FIG. 3.
Figure 5:
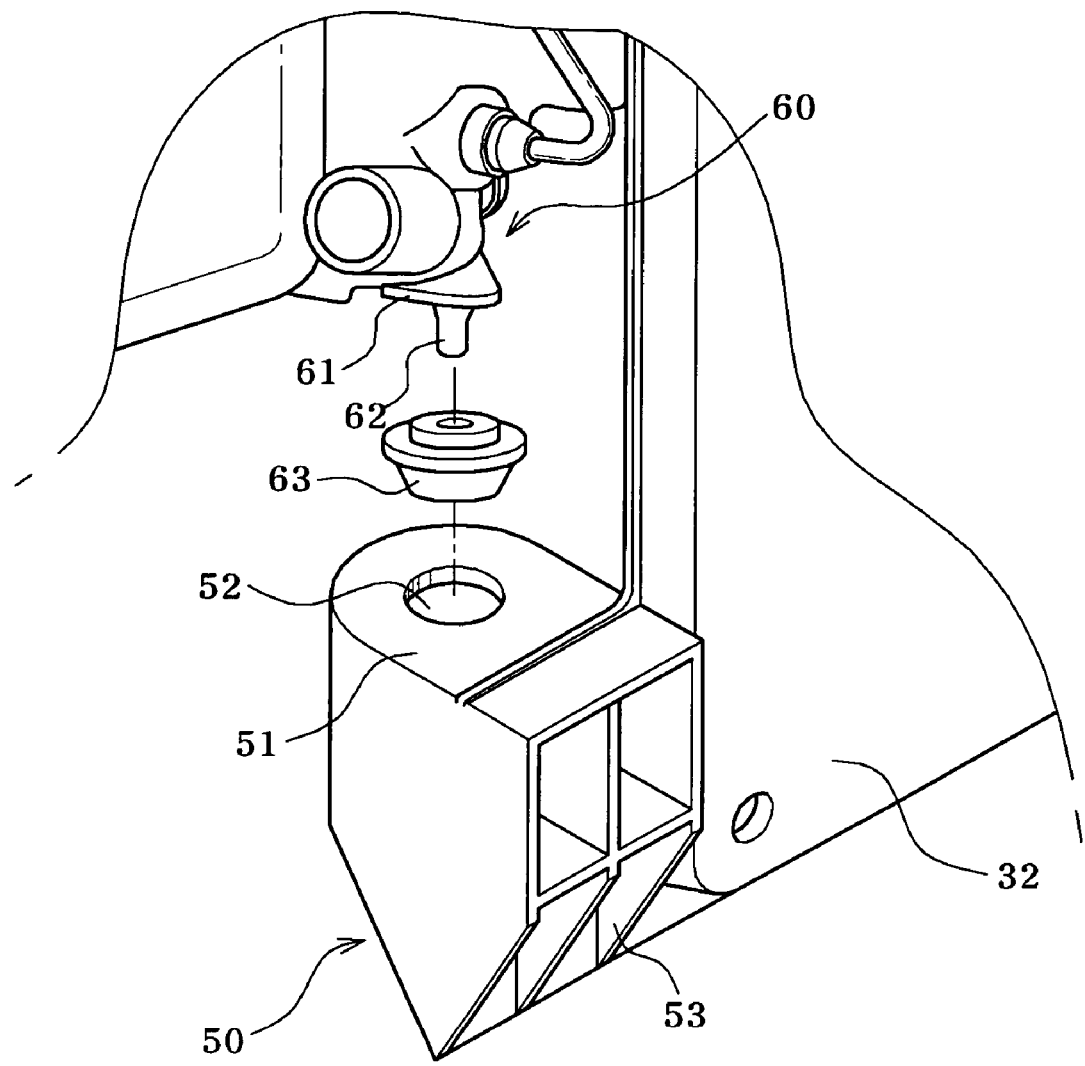
FIG. 5 is a schematic view illustrating another mounting portion formed on the side frame of the carrier in accordance with the present invention.

FIG. 2 is a perspective view of a carrier for vehicles in accordance with the present invention, FIG. 3 is a perspective view of the carrier, in which mounting portions are respectively formed on side frames, FIG. 4 is a schematic view illustrating ribs for supporting the mounting portion shown in FIG. 3, and FIG. 5 is a schematic view illustrating another mounting portion formed on the side frame of the carrier in accordance with the present invention.

As shown in FIGS. 2 to 5, the carrier 40 comprises an upper frame 31, side frames 32, and center frames 43.

More specifically, the side frames 32 in a pair are extended downwardly from the center of the upper frame 31, and are separated from each other by a designated distance.

The center frames 43 in a pair are extended from the central portion of the upper frame 31. One end of each of the center frames 43 is connected to the central portion of the upper frame 31, and the other end of each of the center frames 43 is connected to the corresponding one of the side frames 32 in a pair.

That is, the center frames 43 are connected to the corresponding side frames 32 such that the center frames 43 meet the upper frame 31 at a designated angle. The center frames 43 disperse force, applied to the upper frame 31, to the side frames 32. Thereby, the carrier 40 does not require a lower frame, as being provided in the conventional carrier 10 shown in FIG. 1.

The carrier 40 has a reduced weight by omitting the lower frame, but maintains rigidity by means of the dispersion of force.

The center frames 43 are made of metal having high rigidity by press molding. Here, installation holes are formed through the upper frame 31 and the side frames 32, and connection holes coinciding with the installation holes are formed through both ends of the center frames 43, thereby connecting the center frames 43 to the upper frame 31 and the side frames 32 by bolts.

Recently, as hybrid-type carriers have been manufactured, the center frames 43 may be made of plastic and be formed integrally with the carrier 40 by injection molding.

The upper ends of the center frames 43 may be integrally interconnected, or be separated from each other.

Mounting portions 50 for mounting a cooling module 60 thereon are respectively formed on the side surfaces of the side frames 32.

The cooling module 60 comprises a radiator, a condenser, a fan, and an intercooler, and serves to cool a heated engine of the vehicle.

Bonding portions 61 are formed on both side surfaces of the cooling module 60 at positions corresponding to the mounting portions 50.

Each of the mounting portions 50 comprises a connection plane 51 extended horizontally from the side surface of each of the side frames 32, and a connection hole 52 formed through the connection plane 51.

Connection protrusions 62, which are formed on the bonding portions 61 of the cooling module 60, are inserted into the connection holes 52, thereby allowing the mounting portions 50 of the side frames 32 to support the cooling module 60.

As shown in FIG. 4, the mounting portions 50 are made of steel, and are formed integrally with the side frames 32 by molding. In order to reduce the total weight of the carrier 40, each of the mounting portions 50 is provided with an opened surface and has a hollow structure.

The mounting portions 50 have the hollow structure, thus having low strength. Thus, a plurality of ribs 53 made of plastic are formed inside the mounting portions 50 of the side frames 32.

Further, as shown in FIG. 5, the connection planes 51 provided with the connection holes 52, into which the connection protrusions 62 of the bonding portions 61 are inserted, are formed on the upper ends of the mounting portions 50, and a plurality of the ribs 53 for supporting the connection planes 51 are extended from the lower surfaces of the connection planes 51. Here, the mounting portions 50 are made of plastic, and formed on the side surfaces of the side frames 32 by injection molding.

Now, the function and effects of the above structure of the carrier of the present invention will be described, as follows.

The center frames 43, which are slantingly extended from the central portion of the upper frame 31 in the opposite directions and are connected to the side frames 32, disperse force, applied from the upper part to the carrier 40. Accordingly, the structure of the carrier 40 of the present invention, which does not have a lower frame, maintains the rigidity of the carrier 40 and decreases the weight of the carrier 40.

That is, although the carrier 40 does not comprise a lower frame as being provided in the conventional carrier, the load of the upper frame 31 is dispersed through the center frames 43 in a pair, and, when an external impact is applied to the carrier 40, the connection structure among the frames 41, 42, and 43 rapidly disperses the impact.

The center frames 43 may be made of metal or plastic by molding. In the case that the center frames 43 are made of metal by molding, since the center frames 43 can be formed integrally with the carrier 30 by injection molding, the productivity of the carrier 40 is improved and the weight of the carrier 40 is decreased.

The mounting portions 50 are formed on the side frames 32 of the above carrier 40, and the connection protrusions 62 formed on the bonding portions 61 of the cooling module 60 are inserted into the connection holes 52 formed through the connection planes 51 of the mounting portions 50 by dampers 63 made of rubber.

Thereby, the gravity centers of the side frames 32 and the gravity centers of the mounting portions 50 for supporting the load of the cooling module 60 are close, the mounting portions 50 can stably support the cooling module 60.

The number of the ribs formed by molding is decreased due to the increase of the rigidity of the mounting portions 50, thereby simplifying the molding process of the carrier 40 and decreasing the weight of the carrier 40.

As apparent from the above description, the present invention provides the structure of a carrier, which disperses force, applied from the upper part to the carrier, through center frames slantingly extended from the central portion of upper frame 31 in opposite directions and connected to side frames, thereby enabling the maintenance of rigidity without a lower frame.

Mounting portions are formed on the side frames, and bonding portions of a cooling module, which is mounted on the mounting portions, are formed on side surfaces of the cooling module, thereby causing the gravity centers of the side frames and the gravity centers of the mounting portion to be close and increasing the rigidity of the carrier.

The addition of unnecessary ribs is not required due to the increase of rigidity, thereby decreasing the weight of the carrier.

Accordingly, the structure of the carrier of the present invention, which does not comprise a lower frame, has a reduced weight, improves fuel consumption efficiency of a vehicle, and reduces production costs of the carrier.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A structure of a carrier comprising:
  an upper frame;
  side frames in a pair extending downwardly from both sides of the upper frame;
  center frames, each of which has one end connected to the central portion of the upper frame and the other end slantingly connected to the corresponding one of the side frames;
  mounting portions to mount a cooling module thereon provided at the side frames, said mounting portions being configured to be connected to bonding portions formed on both side surfaces of the cooling module at positions corresponding to the mounting portions;
  said mounting portions including connection planes projecting from the side surfaces of the side frames, and connection holes formed through the connection planes, said connection holes being configured to receive connection protrusions of the bonding portions inserted therein; and a plurality of ribs for supporting the mounting portions provided on each of said side frames, each of said ribs extending downwardly and away from a respective connection plane.

2. The structure as set forth in claim 1, wherein the center frames are made of metal by press molding.

3. The structure as set forth in claim 1, wherein the center frames are made of plastic and formed integrally with the carrier by injection molding.

4. The structure as set forth in claim 1, wherein the mounting portions are made of steel and are formed integrally with the side frames by molding.

5. The structure as set forth in claim 4, wherein said plurality of ribs are made of plastic.

6. A structure of a carrier comprising:

an upper frame;

side frames in a pair extending downwardly from both sides of the upper frame;

center frames, each of which has one end connected to the central portion of the upper frame and the other end slantingly connected to the corresponding one of the side frames; and mounting portions to mount a cooling module thereon provided at the side frames; the mounting portions being configured to be connected to bonding portions formed on both side surfaces of the cooling module at positions corresponding to the mounting portions;

wherein each of the mounting portions comprises:

a connection plane projecting from the side surface of a respective side frame, said connection plane having a connection hole, the connection hole being configured to receive a connection protrusion of the corresponding one of the bonding portions inserted therein; and a plurality of ribs extending downwardly from the lower surface of the connection plane to support the connection plane; and the mounting portions are injection molded plastic and project from the side surfaces of the side frames.

* * * * *